IRRIGATION APPARATUS

Conventional self-propelled sprinkling irrigation systems such as disclosed in U.S. Pat. No. 3,001,721 generally comprise a central pivot about which rotates an elongated irrigation pipe which is supported by self-propelled towers. The apparatus disclosed in said patent irrigates large circular areas of the field but cannot irrigate the corners of the field when the field is rectangular or square shaped. Thus, large areas of the field are unproductive when such a system is used.

Therefore, it is a principal object of this invention to provide an improved irrigation apparatus.

A further object of this invention is to provide an irrigation apparatus which is adapted to irrigate rectangular or square shaped fields.

A further object of this invention is to provide an irrigation apparatus which comprises a transverse sprinkler means which is movably mounted on a water supply pipe means extending along the length of the field.

A further object of this invention is to provide an irrigation apparatus which is efficient in operation.

A further object of this invention is to provide an irrigation apparatus which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 6 is an enlarged sectional view seen along lines 6—6 of FIG. 3; and

FIG. 7 is an enlarged sectional view as seen along lines 7—7 of FIG. 3.

Figure 1:
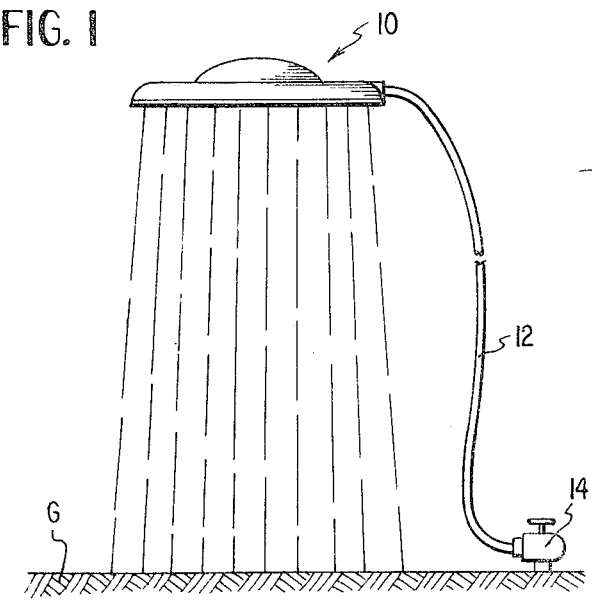
FIG. 1 is a top plan view of a field having the irrigation apparatus of the invention provided thereon.

In FIG. 1, the field to be irrigated is designated by the reference numeral 10 and can be seen to be generally rectangular in shape. If a conventional self-propelled irrigation system were to be used on field 10, the corners 12, 14, 16 and 18 would not be irrigated and would be unproductive.

In the apparatus of this invention, a main water supply pipe 20 is extended through the center of the field. If desired, the pipe 20 could be extended along one end of the field such as end 22. The pipe 20 is preferably supported above the ground 24 by means of a plurality of spaced apart legs 26 secured thereto which extend downwardly into the ground and are anchored by means of concrete 28. Pipe 20 is provided with elongated channels 30 and 32 which are secured to the opposite sides thereof by welding or the like and which extend along the length of the pipe 20. Preferably, at least one of the channels has a plurality of spaced apart openings 34 formed therein along the length thereof. The pipe 20 is in communication with a source of water under pressure.

The numeral 36 refers generally to a plurality of spaced apart water discharge valves which are provided along the length of the pipe 20 and which are in fluid communication with the pipe 20. Each of the valves 36 comprise a hollow pipe 38 secured to the pipe 20 in any convenient manner such as seen in FIG. 6 so that the lower end thereof is in communication with the interior of pipe 20. Pipe 38 includes a funnel shaped upper end 40 below which is mounted a resilient seal or gasket 42. A ring shaped valve seat 44 is secured to the interior wall surface of pipe 36 by welding or the like and has a central opening 46 formed therein. Gasket 45 is mounted on the under side of valve seat 44 for sealing purposes.

A valve member 48 is pivotally secured to the pipe 36 below valve seat 44 and is normally closed upon the gasket 45 to prevent water from escaping from the pipe 20. The water pressure within pipe 20 will normally maintain the valve member 48 in its closed position but a spring means may be mounted on the pivot pin 50 to urge the valve member 48 to its closed position if desired. If extremely high water pressure is present, it may be necessary to provide an auxiliary pivotal valve member 52 on the under side of the valve member 48 which normally closes opening 54 in valve member 48.

Figure 3:
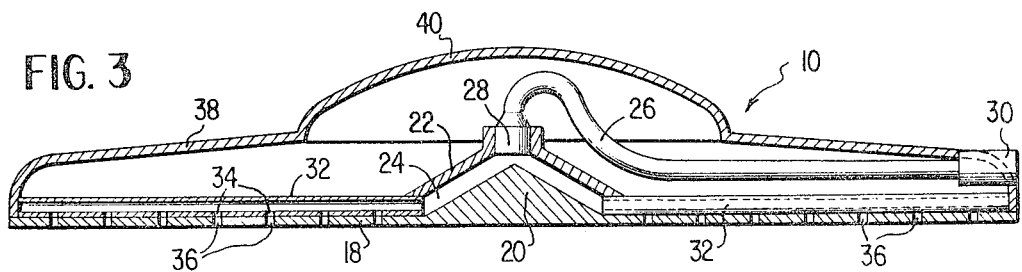
FIG. 3 is an enlarged sectional view as seen along lines 3—3 of FIG. 2 with portions thereof cut away to more fully illustrate the invention.
Figure 4:
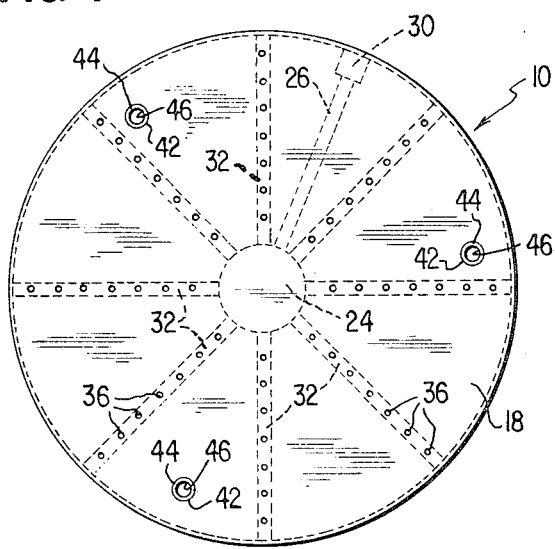
FIG. 4 is a sectional view seen along lines 4—4 of FIG. 3.

The reference numeral 56 designates a valve actuator which is movable along the length of pipe 20 to successively open and close the valves 36 to provide a continuous supply of water to the sprinkling apparatus as the device moves from one end of the pipe 20 to the other end. Actuator 56 includes a pair of spaced apart wheels 58 and 60 which are adapted to move along the channels 30 and 32 respectively. Wheel 60 is provided with teeth 52 at its periphery which register with the openings 34 in channel 32. A plurality of rods 64 are secured to and extend between the wheels 58 and 60 as seen in FIGS. 3 and 4.

Pipe 66 is secured to and extends between the wheels 58 and 60 and is provided with conventional swivel couplings 68 and 70 at its opposite ends adapted to have pipes 72 and 74 rotatably connected thereto. A ring shaped pipe 76 is secured to wheel 58 by any convenient means as illustrated in the drawings. As seen in FIG. 3, pipe 78 is secured to and extends between pipes 76 and 66 to provide fluid communication between pipes 76, 78, 72 and 74. A plurality of spaced apart pipe sections 80 are secured at one end to pipe 76 and are secured at the other end to wheel 60 by any convenient means. Dipper pipes 82 are secured to each of the pipe section 80 and are in fluid communication therewith. The connection between pipe 82 and pipe section 80 is such that pipe 82 is permitted to pivot with respect thereto. The means of connecting the pipe 82 and pipe section 80 is not critical to this invention but the pipe 82 must be permitted a certain amount of movement as will be explained hereinafter. The outer end of the pipes 82 may be provided with an optional valve actuator finger 84 if the optional valve member 52 is utilized.

Figure 5:
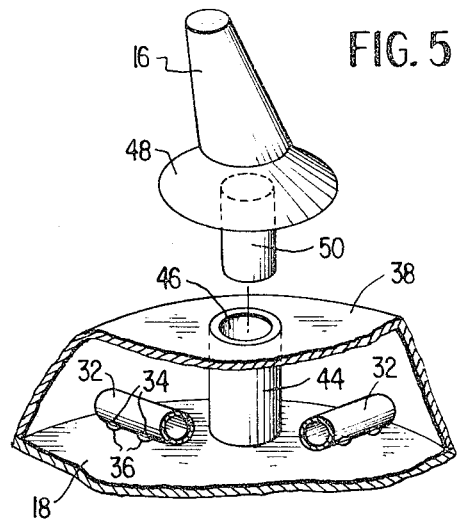
FIG 5 is a fragmentary view of the apparatus seen along lines 5—5 of FIG. 3.

As seen in FIG. 5, collars 86 and 88 rotatably embrace pipe 72 and 74 outwardly of wheels 58 and 60 respectively. If desired, suitable bearings may be employed within the collars to decrease friction between the collars and the pipe. Braces 90 and 92 are secured to collar 86 and extend therefrom as shown in FIG. 5. Braces 94 and 96 are secured to collar 88 and extend therefrom as also illustrated in FIG. 5. An axle 98 or other suitable shaft is secured to and extends between the ends of braces 90 and 94 with an axle 100 secured to and extending between the ends of braces 92 and 96. Rotatable guide wheels 102 and 104 are mounted on axle 98 for movement on channels 30 and 32 respectively with rotatable guide wheels 106 and 108 being mounted on axle 100 for movement on channels 30 and 32. The braces 90, 92, 94, 96 and guide wheels serve to maintain the apparatus on the pipe 20 in an aligned and stable condition. Cross brace 110 is secured to and extends between braces 90 and 94 (Fig. 5) and supports a motor 112, either electric or hydraulic, thereon which has a power shaft 114 extending therefrom. Shaft 114 has a gear 116 mounted thereon which is in mesh with the teeth 62 on the periphery of wheel 60 to provide a power means for driving the apparatus along the pipe 20.

It should be noted that the pipe 20 could be positioned at one side of the field with only one of the pipes 72 or 74 then being required. Any suitable sprinkler irrigation apparatus may be employed on the pipes 72 and 74 but it is preferred that a plurality of spaced apart, self-propelled sprinkling towers 118 be positioned along the length of the pipes to aid in propelling the pipes 72 and 74 along the length of the field and also to maintain the pipes 72 and 74 in an aligned position to reduce stress on the valve actuator 56. Sprinkling towers such as disclosed in U.S. Pat. No. 3,001,721 would be suitable for use along the length of the pipes 72 and 74. Sprinkling towers

PATENTED JUL 25 1972       BEST AVAILABLE COPY       3,679,136

INVENTOR
GARY L. SNYDER

BY Roylance, Abrams,
Berdo & Kaul
ATTORNEYS

3,679,136

CONVERTIBLE WATER SPRINKLING DEVICE

This invention relates to water sprinkling devices and more particularly it relates to a water sprinkling device which can be used in the conventional manner but which can also be converted to provide a novel amusement device for children.

It is, of course, a well known expedient to provide a lawn sprinkling device having a body with a plurality of perforations therein, such body being connectable to the end of a hose so that water will issue out of the perforations and be directed upwardly to form a spray for watering a lawn. It is also known to provide certain water operated toys or amusement devices which can be kept airborne above the ground by means of a water force. Such water force has been used in the prior art to rotate a propeller or rotor on toys, such as toy helicopters, so that the helicopter will "fly" above the ground by means of the lift force provided by the water.

It is an objective of the present invention to combine the beneficial attributes of such conventional lawn sprinklers and such airborne amusement devices into a single, versatile unit.

Another object of the present invention is to provide a new and improved water sprinkling device which can easily be converted from a conventional ground supported sprinkler to an airborne sprinkler which directs a spray downwardly toward the ground.

Another object of the present invention is to provide a water sprinkling device which is relative inexpensive to produce and which can easily be converted from one form to another, without any undue manual manipulation, yet which will provide continued maintenance-free satisfactory operation in both the ground supported mode and the airborne mode.

Other objects, advantages and salient features of the present invention will become apparent from the following detailed description, which, taken in conjunction with the annexed drawings, discloses a preferred embodiment thereof.

The foregoing objects are attained by providing a sprinkling device including a central chamber, preferably of a conical configuration. The central chamber is adapted for connection with an elongated water transmission conduit, such as a hose. The body surrounding the central chamber includes a top and bottom member, which together are designed to simulate the appearance of a flying saucer. A plurality of distribution tubes project radially outwardly from the central chamber and each of the distribution tubes is provided with a plurality of perforations at spaced locations therealong. Corresponding perforations are provided in the bottom member so that as water from the hose passes through the central chamber and is distributed into the tubes, such water will be issued outwardly through the perforations in the tubes and the corresponding holes in the bottom. A series of holes are provided about the periphery of the device for receiving removable legs. When the legs are inserted into the device, the device is orientated with the perforations facing upwardly, which means that the legs are supported upon the ground. In this mode of operation, the water will issue upwardly out of the perforations and will act as a conventional lawn sprinkler or spray. On the other hand, when the legs are removed and the device is inverted so that the perforations face downwardly, the water issuing through such perforations will provide a lifting force which will keep the device airborne, so that the water spray will be directed downwardly toward the ground.

Figure 2:
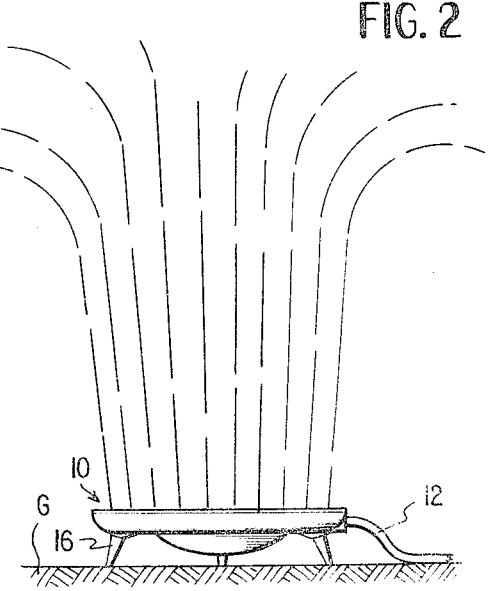
FIG. 2 is an enlarged sectional view as seen along lines 2—2 of FIG. 2.

Referring now to the drawings, which form a part of this original disclosure:

FIG. 1 is a diagrammatic view showing the device in the airborne mode of operation;

FIG. 2 is a diagrammatic view showing the device in the ground supported mode of operation;

FIG. 3 is a transverse sectional view through the device;

FIG. 4 is a bottom plan view of the device; and

FIG. 5 is a fragmentary perspective view through a peripheral portion of the device.

Referring now in greater detail to the drawings, the device itself is generally designated 10 and is formed with an exterior appearance simulating that of a flying saucer. The device is connectable with an elongated water transmission conduit, such as a hose 12 which in turn can be connected with a valved water supply 14. In FIG. 1, the device 10 is elevated above the ground G and the spray being transmitted from the device 10 is being directed downwardly toward the ground G. Thus, while the device in this mode of operation is watering the ground G, it is also providing a shower so that children can run beneath the device 10. In FIG. 2, the device is inverted and is provided with legs 16 which rest upon the ground G. In this configuration, the spray is issuing upwardly away from the ground G.

Referring now to FIG. 3 for a further consideration of the details of the device 10, it will be seen that such device includes a bottom member 13 which supports a central cone or conical projection 20. A second conical member 22 is spaced away from the cone 20 to provide therebetween a conical central chamber 24 into which water from the hose 12 can flow. The chamber 24 is connected with the hose 12 by means of a connecting tube 26 whose inner end 28 is adjacent the chamber 24 and whose outer end 30 is adjacent the periphery of the device 10. The outer end 30 of the connecting tube 26 can be provided with any suitable form of coupling device to enable the same to be connected with a hose or other transmission conduit 12, and since the details of such coupling do not form any part of the present invention, it has not been shown in the drawings.

A plurality of distribution tubes 32 are supported upon the bottom member 20 and project radially outwardly from the central chamber 24. Each of these distribution tubes 32 is provided with a plurality of perforations 34 at spaced locations therealong. Corresponding openings 36 are provided in the bottom 18 with each opening 36 being aligned beneath a perforation 34 in a distributing tube 32. As a result, when water flows through the connecting tube 26 and into the central chamber 24, such water will be distributed to and through the distribution tubes 32. As the water flows through these distribution tubes, it will exit through the perforations 34 and through the aligned openings 36 in the member 18.

As shown in FIG. 3, a top or cover member 38 is provided to fit over the bottom 18, and the member 38 is provided with a centrally domed portion 40. Suitable openings 42 are provided about the periphery of the device 10, with each such opening being adapted to receive and hold a cylindrical bushing 44 having a through bore 46 which opens through both the bottom 18 and the top 38. As shown in FIG. 5, each removable leg 16 includes an enlarged shoulder portion 48 adapted to seat against the cover member 38 and an integral shaft portion 50 adapted to frictionally fit within the bore 46 of the bushing 44. Thus, the legs 16 can be attached with the device 10 merely by manually inserting the shaft 50 into the bushing 44 wherein the shaft and hence the leg will be held by friction.

When the legs 16 are so inserted into the device, as shown in FIG. 2, the domed portion 40 will be directed toward the ground and hence the perforations and the openings 36 will be directed upwardly. The water issuing through these perforations and openings will thus simply provide an upwardly directed spray. On the other hand, when it is desired to convert the device into an airborne orientation or mode of operation, the domed portion is directed upwardly and the legs are removed, as shown in FIG. 1. In this orientation, the water issuing through the perforations and openings will be directed downwardly and will provide an adequate lift force to keep the device 10 airborne above the ground.

The device 10 and the component parts thereof can be advantageously fabricated of plastic materials, but the invention need not be limited to such plastic materials. Similarly, the number of tubes and apertures, perforations and openings, and the placement thereof, is merely shown herein in one advantageous form, and the invention is not so limited. After reading the foregoing detailed description, it will be apparent that the objects set forth at the outset hereof have been successfully achieved by the present invention. However, changes and modifications obvious to those skilled in the art may be made without departing from the spirit and scope of the present invention, as defined in the appended claims.

What is claimed is:

1. A water sprinkling device convertible from a ground supported upwardly sprinkling orientation to an airborne downwardly sprinkling orientation, said device comprising:
   means including a central chamber adapted to be connected with an elongated water transmission conduit;
   a plurality of distribution tubes connected with and extending radially outward from said central chamber;
   said distribution tubes each having a plurality of perforations formed therein at spaced apart locations along each tube;
   said means having a plurality of spaced apart peripheral apertures therein adapted to receive removable legs;
   said device being positionable in said ground orientation by directing said perforations upwardly and by inserting said legs in said apertures so that said legs rest upon said ground, whereupon water issuing from said perforations will be directed upwardly away from said ground;
   said device also being positionable in said airborne orientation by directing said perforations downwardly and by removing said legs from said apertures, whereupon water issuing from said perforations will provide lift to keep said device airborne and will provide a spray directed downwardly toward said ground.

2. A water sprinkling device as defined in claim 1 having an external appearance simulating a flying saucer.

3. A water sprinkling device as defined in claim 1 wherein said central chamber is of a conical configuration.

4. A water sprinkling device as defined in claim 3 wherein said means includes a substantially flat bottom member having spaced openings aligned beneath said perforations, and a domed top member within which said central chamber is disposed.

* * * * *